US009937772B2

(12) United States Patent
Gries

(10) Patent No.: US 9,937,772 B2
(45) Date of Patent: Apr. 10, 2018

(54) HEATER

(71) Applicant: MAHLE International GmbH, Stuttgart (DE)

(72) Inventor: Jean-Philippe Gries, Colmar (FR)

(73) Assignee: MAHLE International GmbH, Stuttgart (DE)

( * ) Notice: Subject to any disclaimer, the term of this patent is extended or adjusted under 35 U.S.C. 154(b) by 542 days.

(21) Appl. No.: 14/519,820

(22) Filed: Oct. 21, 2014

(65) Prior Publication Data

US 2015/0108117 A1 Apr. 23, 2015

(30) Foreign Application Priority Data

Oct. 21, 2013 (EP) .................................... 13290250

(51) Int. Cl.

| | |
|---|---|
| ***H05B 3/02*** | (2006.01) |
| ***B60H 1/22*** | (2006.01) |
| ***F24H 3/04*** | (2006.01) |
| ***F24H 9/20*** | (2006.01) |
| ***H05B 1/02*** | (2006.01) |
| ***H05B 3/24*** | (2006.01) |

(52) U.S. Cl.

CPC ......... *B60H 1/2215* (2013.01); *F24H 3/0429* (2013.01); *F24H 3/0435* (2013.01); *F24H 3/0441* (2013.01); *F24H 9/2071* (2013.01); *H05B 1/0236* (2013.01); *H05B 3/24* (2013.01); *F24H 2250/04* (2013.01); *H05B 2203/023* (2013.01)

(58) Field of Classification Search

CPC .. B60H 1/2215; B60H 1/2218; B60H 1/2225; F24H 3/0429; F24H 3/0435; F24H 3/0441; F24H 3/0405; F24H 3/0458; F24H 3/0447; F24H 9/2071; F24H 9/1872; F24H 2250/04; H05B 1/0236; H05B 3/24; H05B 3/14; H05B 3/50; H05B 3/06; H05B 3/16; H05B 2203/023; H05B 2203/02; H05K 1/0204

See application file for complete search history.

(56) References Cited

U.S. PATENT DOCUMENTS

| | | | | |
|---|---|---|---|---|
| 7,200,327 | B2 | 4/2007 | Pierron et al. | |
| 2002/0011484 | A1 | 1/2002 | Beetz et al. | |
| 2004/0084431 | A1 * | 5/2004 | Uhl ...................... | B60H 1/2225 219/201 |
| 2005/0092737 | A1 | 5/2005 | Brun et al. | |

FOREIGN PATENT DOCUMENTS

| | | | |
|---|---|---|---|
| DE | 199 25 757 | A1 | 12/2000 |
| EP | 1 157 869 | A2 | 11/2001 |
| EP | 1 521 499 | A1 | 4/2005 |
| EP | 1621826 | * | 2/2006 |
| EP | 1 986 482 | A1 | 10/2008 |
| KR | 20-2010-000610 | U | 1/2010 |
| WO | WO 03/086018 | A1 | 10/2003 |

* cited by examiner

*Primary Examiner* — Shawntina Fuqua

(74) *Attorney, Agent, or Firm* — Muncy, Geissler, Olds & Lowe, P.C.

(57) ABSTRACT

A heater, particularly for a motor vehicle, having at least one heating element for heating air and a control unit, which has a control circuit, arranged on a printed circuit board, for controlling the at least one heating element, whereby the at least one heating element has ribs and a contact strip, whereby a contact strip section is arranged on the circuit board of the control circuit and forms a connection between the at least one heating element and the control circuit.

14 Claims, 3 Drawing Sheets

HEATER

This nonprovisional application claims priority to European Patent Application No. EP 13290250.3, which was filed in Europe on Oct. 21, 2013, and which is herein incorporated by reference.

BACKGROUND OF THE INVENTION

Field of the Invention

The present invention relates to a heater, particularly for a motor vehicle.

Description of the Background Art

Heaters, particularly electric heaters, have a variety of uses in motor vehicles. Typical areas of application for the electric heater are the interior air of a passenger compartment of the motor vehicle, heating, particularly the preheating of cooling water in water-cooled internal combustion engines, or the warming of fuel at cold outside temperatures. The heater is often also used as auxiliary heating. The heater typically has one or more heating elements and a control unit for controlling and regulating the heater. The heating elements are usually formed as an electrical thermal resistor, particularly as a PTC element (Positive Temperature Coefficient). The heating elements and the control unit can be formed as separate units connected by means of lines. It is also known, however, to place the heating elements and the control unit in a structural unit, particularly in a frame, in order to make the connecting lines as short as possible.

EP 1 157 869, which corresponds to U.S. 2002/0011484, discloses a supplementary electric heating device for motor vehicles, which has a heating block having a plurality of layered or stacked heating elements, which are formed as resistance heating elements and are disposed in a frame. The supplementary heating device has a control device, which is arranged on a circuit board, arranged perpendicular to a plane of the frame after assembly. The supplementary heating device is supplied with current via two connecting lugs, which project preferably on the side from the control device.

WO 03/086018 A1, which corresponds to U.S. Pat. No. 7,200,327, discloses an electric heating device particularly for heating or for an air conditioning unit in a motor vehicle. The heating device has a housing and at least one resistive heating element, which is disposed in the housing. A control circuit, which controls the electrical current supply for the heating elements, is typically connected to a current/voltage source by means of a plug-in connector.

SUMMARY OF THE INVENTION

It is therefore an object of the present invention to provide an improved heater.

In an exemplary embodiment of the invention, the heater, which can be used in particular in a motor vehicle, has at least one heating element for heating the air flowing through it and a control unit, which has a control circuit, arranged on a printed circuit board, for controlling the heating elements, whereby the at least one heating element has ribs and a contact strip, whereby a contact strip section is arranged on the circuit board of the control circuit and forms a connection between the at least one heating element and the control circuit.

The contact strip section or the contact strip can be formed as a flat sheet. The heating element can be configured as a PTC element. Cooling by means of a PTC connection can be realized by the arrangement of the contact strip of the heating element. It is advantageous hereby that the heating element, particularly the PTC element, is connected directly to the control unit. As a result, the undesirable "hot spots" known from the prior art at the connection between the control circuit and the heating element can be at least reduced or prevented. The contact strip, which is normally used completely in its entire length as heating in the heating element, can be used as a cooling element with the design of the invention. It is of advantage in this case that the heating elements known per se and already in use, particularly their contact strips, can be used. No new geometric redesigning needs to occur.

The contact strip, particularly the contact strip section, can be connected with a connector using clip-on technology and thus fixed on the circuit board.

The heater can be used in a standard network of a motor vehicle having an internal combustion engine, in a hybrid vehicle, and/or in an electrically operated motor vehicle.

In an embodiment of the heater, the contact strip section can be detachably connected to the circuit board.

A connector can be arranged on the circuit board, via the connector a fixation and/or contacting of the contact strip section on the circuit board can be realized. The new connection preferably allows a simple and good heat distribution.

In a further design of the heater, the length of the contact strip section can be configured greater than a fourth of the width or half the width of the circuit board. The length of the contact strip section in this case can be adapted preferably to the position of the electronic components of the control unit.

The circuit board of the control circuit and/or the at least one heating element can be arranged at least in sections or regions in a housing. The housing can be a plastic housing.

Electronic components of the control circuit can be cooled by means of the contact strip section.

In a further design of the heater, the contact strip section can be arranged within the housing of the heater or the control unit.

In a further design of the heater, the contact strip section can be arranged outside the housing.

The ribs of the heating element can be arranged on the circuit board in order to be able to realize a cooling for the electronic modules of the control circuit. These can be MOSFET modules, for example. As a result, the components of the heating element can be optimally utilized.

The at least one heating element can be a first heating element and the heater has further heating elements. The heating elements can be arranged parallel to one another.

The resulting overall advantage is that no separate cooling devices need to be used for the control unit. The connection between the contact strip and the circuit board is simple to configure and practical in terms of mounting. In addition, standardized components can be used, for example, as the contact strip, heating element, printed circuit board, and/or connector. The connection can moreover be used in a space-saving way. It may further be possible to create a fixed connection in which the connector is molded together with the circuit board.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
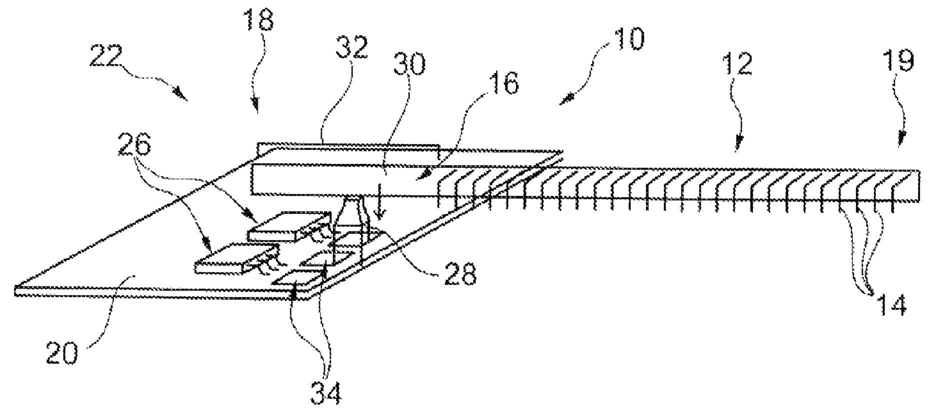
FIG. 1 shows an exemplary embodiment of a heater with a contact strip.

FIG. 1, in a schematic perspective illustration, shows an exemplary embodiment of a heater 10 of the invention with a heating element 12. Heating element 12 is preferably configured as a PTC heating element 12. Heating element 12 has ribs 14. Ribs 14 are arranged on a contact strip 16 formed as a sheet, also called a sheet below, which is arranged at its first end 18 on a circuit board 20. The section of the contact strip arranged on circuit board 20 is called the contact strip section. Contact strip 16 functions as a cooling sheet for electronic components arranged on the circuit board. A second end 19 of contact strip 16 is distantly arranged from circuit board 20. Contact strip 16 is preferably configured as a flat metal strip.

Circuit board 20 is part of a control unit 22 with a control circuit 24, of which only two MOSFETs 26 (metal oxide semiconductor field effect transistor) are shown as examples. Contact strip 16 is held in a connector 28 arranged on circuit board 20 and preferably attached thereto. Connector 28 is preferably brazed with or soldered to circuit board 20.

Contact strip 16 arranged on circuit board 20 has a contact strip section or sheet section 30 of a defined length 32. Contact strip 16 with sheet section 30 can realize the cooling of circuit board 20 in general and particularly the electronic components, arranged on circuit board 20, of control circuit 24.

Only one heating element 12 is shown in heater 10 of FIG. 1, whereby heating element 12 is a first heating element 12 and other heating elements 12 can be arranged in heater 10. Preferably, each heating element 12 is arranged on a separate contact strip 16, which is arranged with sheet section 30 on circuit board 20.

So-called pads 34 are arranged on circuit board 20 for attaching or fixing connector 28. Pads 34 can be configured depending on the area and thickness of a coating on circuit board 20 and the design of pins 36 of connector 28.

Figure 2:
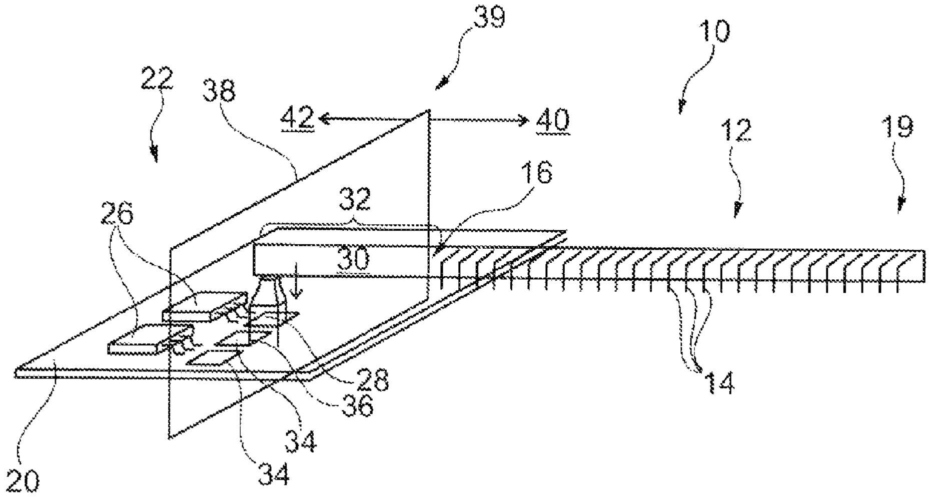
FIG. 2 shows an exemplary embodiment of the heater with the contact strip.

FIG. 2 shows in a schematic, perspective illustration an exemplary embodiment of heater 10. The embodiments of FIGS. 1 and 2 differ in the position of connector 28 on circuit board 20. In the exemplary embodiment shown in FIG. 2, pads 34 and connector 28 arranged thereon are arranged approximately centrally on circuit board 20. A rectangle 38 represents the boundary 39 between a region 40 located within heater 10 and a region 42 located outside heater 10. Rectangle 38 symbolizes here a part of a housing (not shown) in which control unit 22 of heater 10 is disposed.

Figure 3:
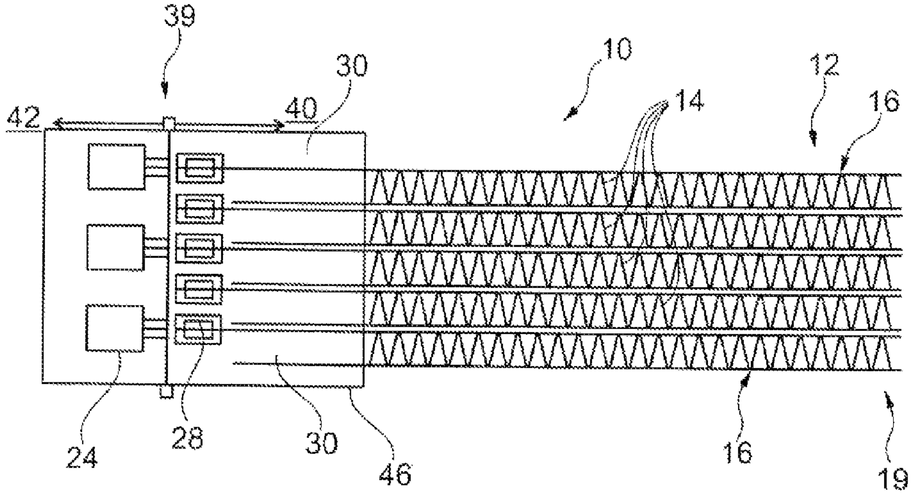
FIG. 3 shows the heater in a top plan view with the contact strip within a housing of a control unit.

FIG. 3 shows heater 10 with five heating elements 12, of which only ribs 14 are shown. Ribs 14 have a zig-zag shape and are preferably bent into the zig-zag shape from a metal sheet.

Ribs 14 are each arranged on contact strip 16. Contact strips 16 have the particular sheet section 30 that is arranged in each case on circuit board 20. The particular first end 18 of sheet section 30 is arranged in connector 28 associated with the section. Connectors 28 are arranged within housing 46.

Figure 4:
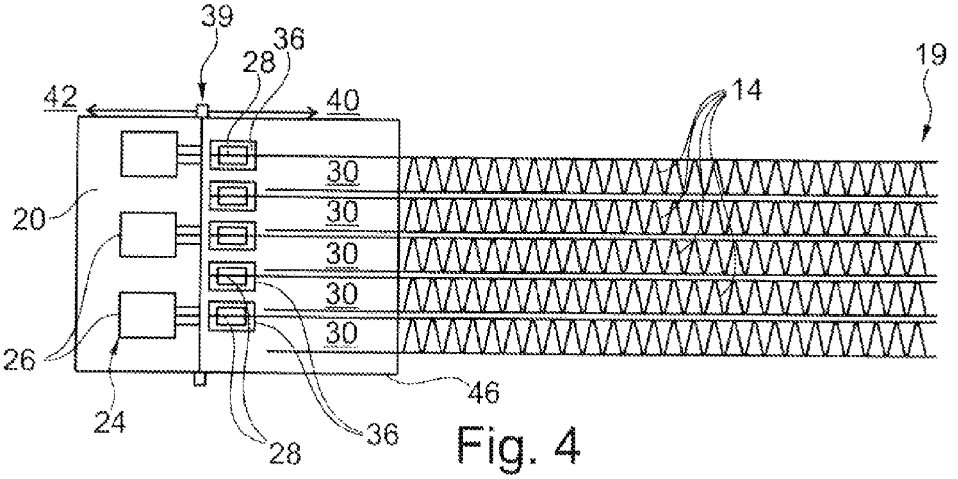
FIG. 4 shows the heater in top plan view with the contact strip outside the housing of the control unit.

FIG. 4 shows heater 10 in a schematic illustration in a top plan view. Connectors 28 and sheet sections 30 are arranged outside housing 46.

Figure 5:
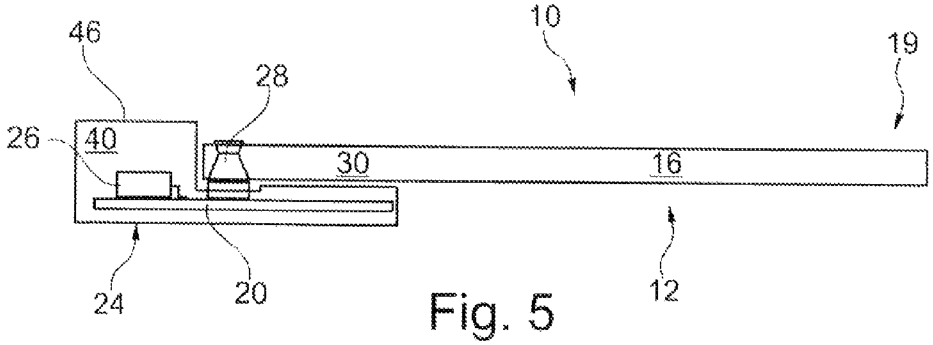
FIG. 5 shows the heater of FIG. 4 in a side view.

FIG. 5 shows heater 10 in a schematic illustration in a side view. Connectors 28 are arranged outside housing 46. Contact strip 16 and the shown sheet section 30 are each also arranged outside housing 46.

Figure 6:
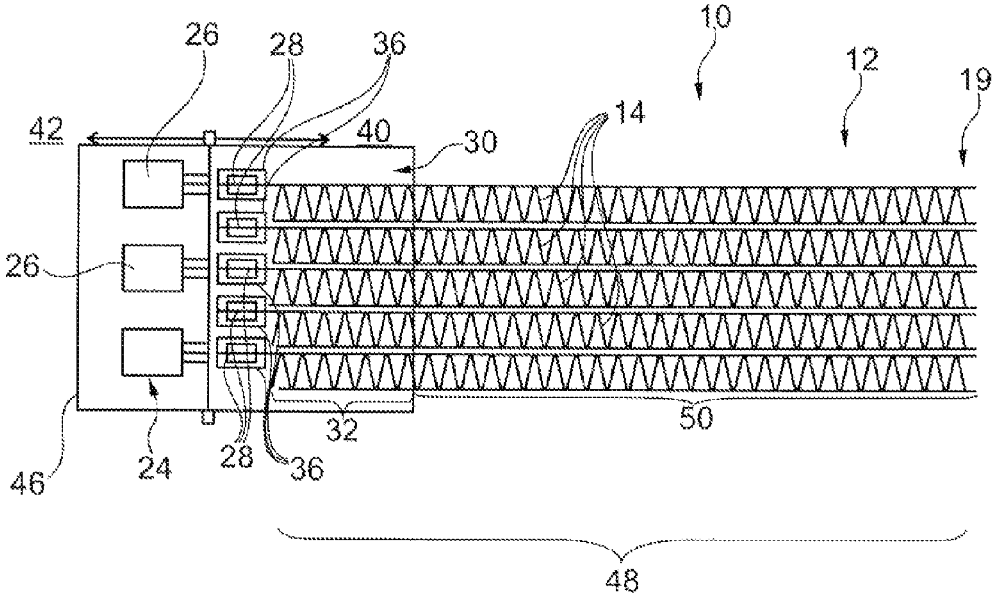
FIG. 6 shows an exemplary embodiment of the heater in a top plan view.

FIG. 6 shows an embodiment of heater 10 in which ribs 14 and contact strip 16 are arranged completely up to the connecting point of the particular contact strip 16 and of sheet section 30 with the associated connector 28. Connectors 28 and sheet section 30 are located outside housing 46. In this regard, ribs 14 can realize a cooling function for control circuit 24, arranged on circuit board 20, or subsections thereof.

Contact strip 16 and sheet section 30 are preferably made of aluminum or an aluminum alloy. The total length 48 of heating element 12 includes length 32, located within heater 10, and a length 50 of contact strip 16. Ribs 14 of heating element 12 are arranged over length 50.

It is advantageous in an exemplary embodiment according to FIG. 6 for the mutually molded connections to be soldered together on a circuit board.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heater for a motor vehicle, the heater comprising:

at least one heating element for heating air; and a control unit that has a control circuit arranged on a printed circuit board for controlling the at least one heating element, wherein the at least one heating element is a contact strip having ribs extending therefrom, wherein a section of the contact strip is arranged on the circuit board of the control circuit and forms a connection between the at least one heating element and the control circuit, and wherein some of the ribs of the at least one heating element are arranged on the circuit board and realize a cooling for electronic modules of the control circuit.

2. The heater according to claim 1, wherein the section of the contact strip is detachably connected to the circuit board.

3. The heater according to claim 1, wherein a connector is arranged on the circuit board, via the connector a fixation and/or contacting of the section of the contact strip on the circuit board is achieved.

4. The heater according to claim 1, wherein a length of the section of the contact strip is formed greater than a fourth of a width or greater than half of the width of the circuit board.

5. The heater according to claim 1, wherein the at least one heating element and/or the circuit board of the control circuit are arranged at least in sections or regions in a housing.

6. The heater according to claim 1, wherein electronic components of the control circuit are cooled via the section of the contact strip.

7. The heater according to claim 1, wherein the section of the contact strip is arranged within a housing of the heater or the control unit.

8. The heater according to claim 1, wherein the section of the contact strip is arranged outside of a housing.

9. The heater according to claim 1, wherein the at least one heating element is a first heating element and the heater has a further heating element.

10. The heater according to claim 1, wherein the at least one heating element is a flat metal strip with the ribs extending therefrom along at least a portion of the length of the flat metal strip.

11. The heater according to claim 1, wherein the at least one heating element is a PTC heating element.

12. The heater according to claim 1, wherein a connector is provided between the contact strip and the printed circuit board, such that the connector forms the connection between the at least one heating element and the control circuit.

13. The heater according to claim 12, wherein the connector has pins extending therefrom that contact pads on the printed circuit board.

14. The heater according to claim 12, wherein the at least one heating element is a flat metal strip with the ribs extending therefrom along at least a portion of the length of the flat metal strip, and wherein one end of the flat metal strip directly contacts the connector.

* * * * *